May 28, 1946.  J. U. RIDDER  2,400,889
WELDING APPARATUS
Filed March 3, 1943  3 Sheets-Sheet 2
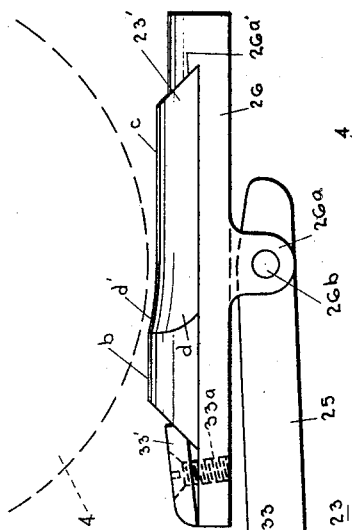
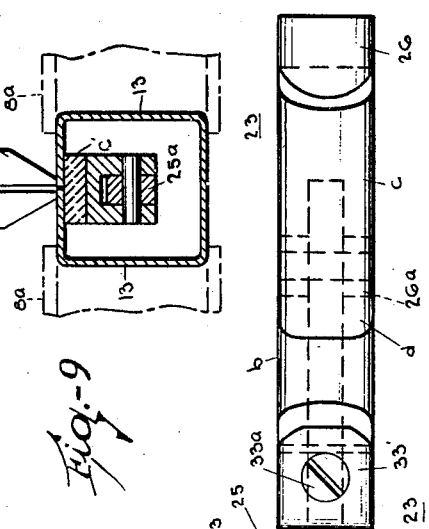
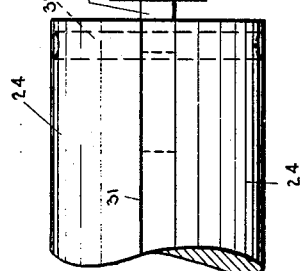
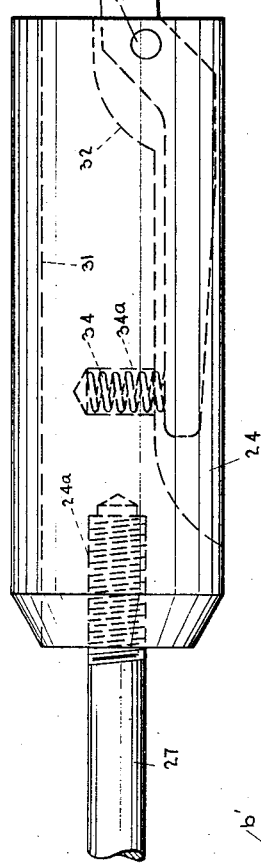
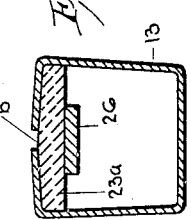
INVENTOR
JOSEPH U. RIDDER
BY Geo. B. Pitts
ATTORNEY May 28, 1946.                J. U. RIDDER                2,400,889
                           WELDING APPARATUS
                        Filed March 3, 1943            3 Sheets-Sheet 3
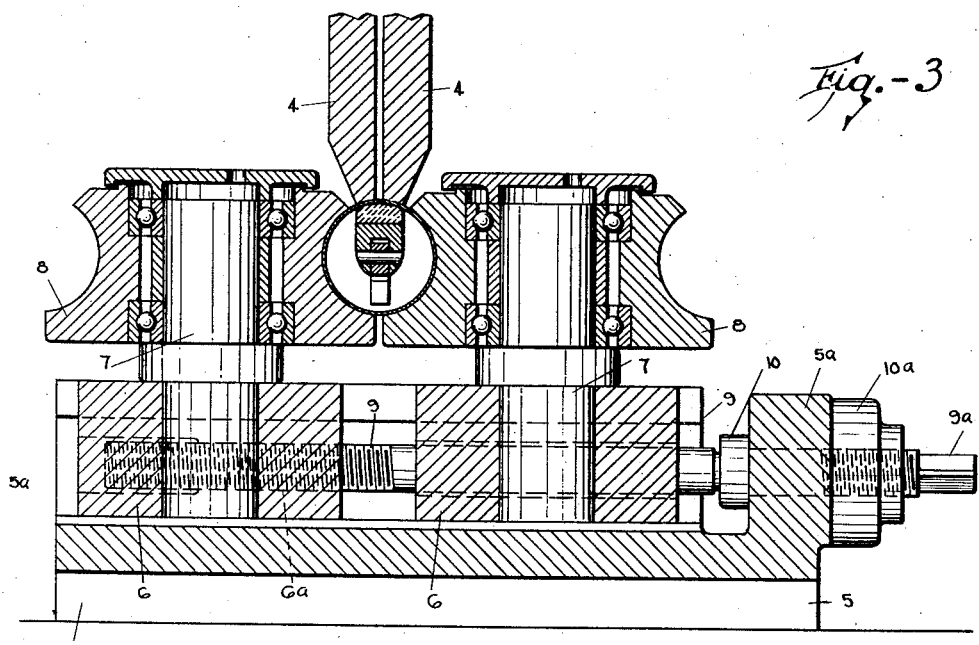
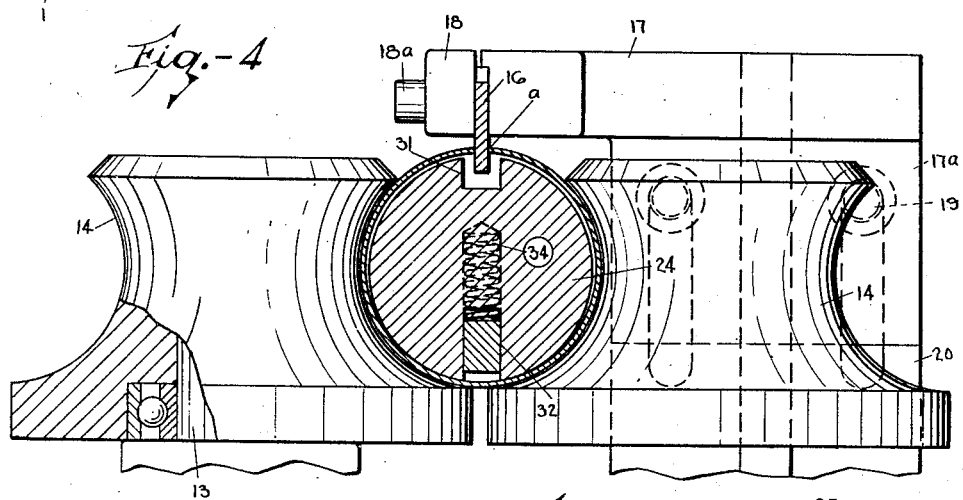
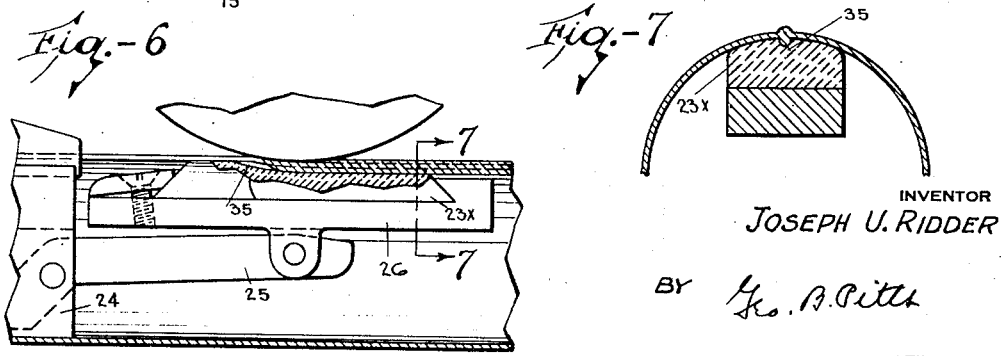
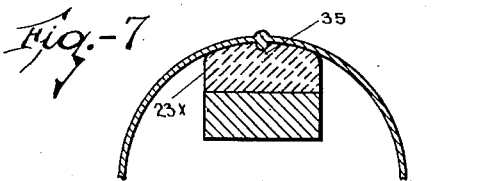
INVENTOR
JOSEPH U. RIDDER
BY
ATTORNEY Patented May 28, 1946

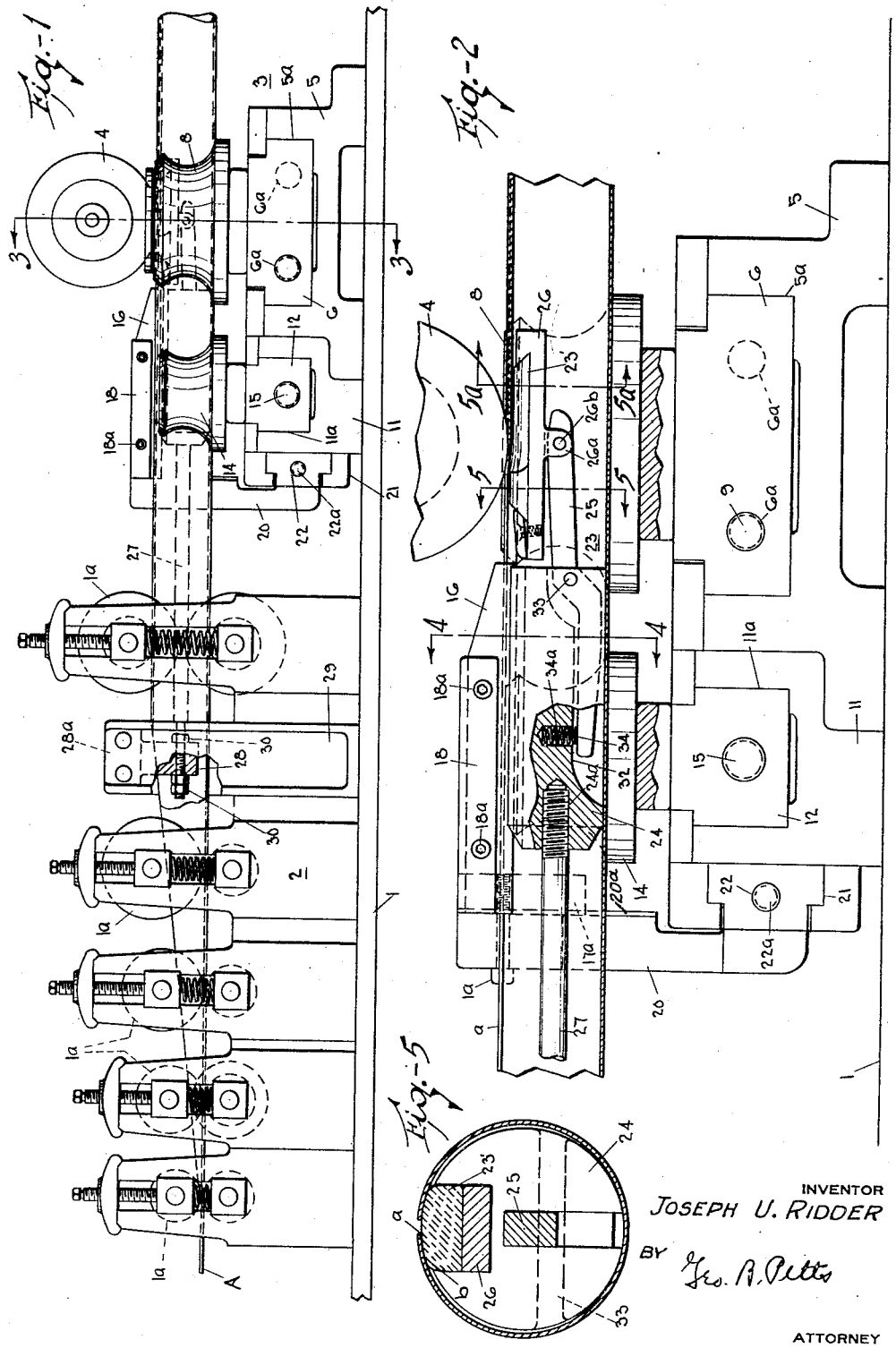

2,400,889

UNITED STATES PATENT OFFICE 2,400,889

WELDING APPARATUS

Joseph U. Ridder, Lakewood, Ohio, assignor to The Yoder Company, Cleveland, Ohio, a corporation of Ohio Application March 3, 1943, Serial No. 477,862

9 Claims. (Cl. 219—6)

This invention relates to welding apparatus, more particularly to apparatus for welding the seams of preformed tubing. The welding apparatus may be associated with a suitable tube forming mechanism, whereby the forming of the tubing and welding of its seam may be carried on continuously and fed to suitable sizing and cut-off mechanisms.

Heretofore, in all apparatus for welding the seams of preformed tubing, of which I have knowledge, the welding operation produced a bead or burr both exteriorly and interiorly of the tubing and it became necessary, with few exceptions dependent upon the specific applications of the tubing, to remove these beads, whereby the outer and inner walls of the tubing were made smooth and of uniform thickness circumferentially.

The exterior burr being freely accessible, it may be easily removed either during movement of the tubing or after it has been cut into sections; but removal of the interior burr has presented serious difficulties incident to the provision of cutting devices fixedly mounted within the tubing, more particularly where these devices were employed in tubing that was continuously fed relative to the welding means, whereby such feeding movement relative to the cutting devices was intended to effect a removal or cutting away of the interior bead or burr.

Accordingly, it will be apparent that if the operation of welding the seam of the tubing or sections of tubing can be carried out in a manner which prevents the formation of an interior bead these difficulties will be overcome and upkeep expense will be reduced.

One object of the invention is to provide an improved apparatus for welding the seam of tubing wherein provision is made for eliminating the formation of a bead on the inner wall of the tubing as welding of the tube seam takes place.

Another object of the invention is to provide an improved tube welding apparatus having a device co-operatively related to the heating means and arranged to prevent the formation of a bead on the inner wall of the tubing as welding of the tube seam takes place.

Another object of the invention is to provide an improved tube welding apparatus having a device co-operatively related to the heating means and the squeeze rolls adjacent thereto, for guiding the seam edges of the tubing into welding position and for preventing the formation of a bead or burr on the inner wall of the tube as welding of the tube seam takes place.

Another object of the invention is to provide in welding apparatus an improved device co-operatively related to the welding devices for maintaining the marginal edges of the tube seam in opposed or alined relation during welding of the seam, whereby overlapping of these edges due to pressure on the side walls of the tubing is eliminated.

A further object of the invention is to provide an improved tube welding apparatus having within the tube a device co-operatively related to the welding electrodes and engaging the tube walls under pressure to limit or prevent flow of metal into the tube due to heating of the seam edges thereof as welding of the tube seam takes place.

A further object of the invention is to provide, in tube welding apparatus, an improved mechanism arranged to be positioned within the tubing and having a shoe maintained under pressure against the tube walls adjacent to the seam edges of the tubing for guiding these edges in alined relation relative to the welding electrodes.

A further object of the invention is to provide, in tube welding apparatus, an improved mechanism arranged to be positioned within tubing and having a shoe shaped to bridge the tube seam and maintained under pressure against the tube walls adjacent to the seam edges in and throughout the area where welding of the seam takes place.

Other objects of the invention will be apparent to those skilled in the art to which my invention relates from the following description taken in connection with the accompanying drawings, wherein Fig. 1 is a fragmentary side elevation of a tube forming mechanism and a welding apparatus for welding the tube seam, said apparatus embodying my invention.

Fig. 1a is a side elevation of the mechanism arranged to engage the walls of the work remote from the welding devices for preventing the formation of a bead or burr on said walls and maintain the seam edges of the work in alined relation.

Fig. 1b is a plan view of parts shown in Fig. 1a.

Fig. 2 is a view similar to Fig. 1, with parts broken away.

Fig. 3 is a section on the line 3—3 of Fig. 1.

Figs. 4, 5 and 5a are sections on the lines 4—4, 5—5 and 5a—5a, respectively, of Fig. 2.

Fig. 6 is a fragmentary view (partly in elevation and partly in section) illustrating a modified form of construction.

Fig. 7 is a section on the line 7—7 of Fig. 6.

Fig. 8 is a fragmentary section, corresponding to the section on the line 5—5 of Fig. 2, but showing the application of the invention to tubing of polygon form in cross section.

Fig. 9 is a fragmentary section, corresponding to the section on the line 5a—5a of Fig. 2, but showing the application of the invention to tubing such as shown in Fig. 8.

In the drawings, 1 indicates a suitable bed or support on which a suitable mechanism, indicated as an entirety at 2, is mounted for continuously forming sheet material A into hollow form, with its side edges in opposed relation to form a seam a, whereby the latter may be welded as the form is fed to and past the welding apparatus indicated as an entirety at 3, which is preferably mounted on the bed 1. The mechanism 2 may be constructed to shape the material into hollow form that is round or otherwise shaped in cross section, since the welding apparatus 3 embodying my invention is not to be limited to round tubing as herein illustrated for exemplifying one form of construction. The forming mechanism 2 consists of a plurality of passes 1a, the number thereof being dependent on the size of the tubing and the thickness and quality of the sheet metal employed. The construction and mounting of the passes 1a form no part of the present invention. The welding apparatus 3 is shown in contiguous relation to the forming mechanism 2, as that is the preferred arrangement to facilitate welding of the tube seam according to the dictates of my invention.

The welding apparatus 3 is preferably of the resistance type employing rotary electrodes 4, which may be mounted and supplied with current in any desired manner, for example, as shown in Letters Patent No. 2,283,941, dated May 26, 1942.

5 indicates a base member suitably fixed to the bed 1 and shaped to form a transverse guideway 5a for blocks 6 which support a pair of vertical shafts 7. The upper ends of the shafts 7 are provided with suitable anti-friction bearings for removably supporting a pair of rolls 8, which engage the opposite sides of the tubing (see Fig. 3). The axes of the shafts 7 are disposed in a plane which cuts the axes of the electrodes 4, so that the rolls 8 engage the tubing at opposite sides of the point of contact of the electrodes 4 therewith. The peripheries of the rolls 8 are complementary to the side walls of the tubing and are adjusted into fixed relation, whereby they function to contract the tubing as its contiguous portions move past the electrodes to effect engagement of its seam edges. Each block is formed with a screw threaded opening 6a, having engagement with the threaded portion of a rod or shaft 9, which is rotatably mounted in an upstanding wall 5a on the base member 5; shoulders 10, 10a, on each rod 9 serving to prevent endwise movement thereof when rotated by a tool engaging its outer irregular shaped end 9a.

The rolls 8 being removable, other rolls may be substituted therefor dependent upon the size of the formed tube.

11 indicates a supplemental base member fixed to the bed 1 rearward of the base member 5 and shaped to form a transverse guideway 11a for a pair of blocks 12, which support a pair of shafts 13 removably supporting a pair of guide rolls 14 for the tubing, the blocks 12 being relatively movable by a shaft or rod 15 having right and left hand screw threaded portions (not shown) engaging correspondingly screw threaded openings formed in the blocks 12.

16 indicates a guide device disposed in close relation to the electrodes 4 and rolls 8 in advance thereof, that is, between the feeding means for the work and the electrodes. The guide 16 is arranged to project into the tube seam a (see Figs. 1, 2 and 4) for maintaining the seam edges spaced during movement of the tubing toward the electrodes and the squeeze rolls 8. The device 16 is elongated longitudinally of the tubing so as to extend through a long portion of the seam a to insure alinement thereof with the electrodes 4. The upper portion of the spacing device 16 is clamped against the outer end of a bracket 17 by a plate or bar 18, which is secured to the bracket by suitable cap screws 18a. The bracket 17 is provided with a depending member 17a which is adjustably secured by screws 19 to a support 20, whereby the bracket 17 may be raised or lowered. The support 20 is provided with a rib or key 20a and the member 17a is formed with recess complementary thereto, to guide the member 17a during adjustment thereof. The support 20, at its lower end slidably fits a transverse guideway 21 provided on the supplemental base member 11. The support 20 is formed with a screw threaded opening 22 for a screw threaded rod or shaft 22a, which is mounted similarly to the rods 9 in the supplemental base member 11, whereby the support 20 may be adjusted transversely of the bed 1; the adjustments above referred to permitting the spacing device 16 to be positioned for engagement with the seam edges of different sized tubing.

23 indicates as an entirety mechanism mounted within the tubing and having a guide device 23', a portion of which is co-operatively related to the electrodes 4 for preventing the formation of a burr or bead on the inner wall of the tubing as welding of its seam edges takes place. The mechanism 23 consists of a holder 24 preferably shaped in cross section to loosely fit the inner wall of the tubing and provide a mandrel therefor as the tubing is fed past the guide rolls 14, a rocker 25 fulcrumed on the holder, a pressure member 26, mounted on the outer end of the rocker and carrying the guide device 23'. The inner end of the holder 24 is connected to the outer end of a rod 27 extending through the tubing to position the holder in advance of the electrodes, that is, between them and the feeding means for the tubing. By preference, the inner end of the holder 24 is provided with an inwardly extending screw threaded opening 24a in which the outer threaded end of the rod 27 is mounted, the rotation of the rod being effective to adjustably secure the rod and holder together. The inner end of the rod 27 is adjustably fixed to a support 28 which projects into the tubing at an intermediate stage in its formation; the support 28 preferably being integrally connected to a cross member 28a secured at its opposite ends to a pair of spaced uprights 29 (only one being shown) mounted on the bed 1 at opposite sides of the tubing. The inner end portion of the rod 27 extends through an opening formed in the support 28 and such end portion is provided with screw threads to take nuts 30 which are clamped against the opposite sides of the support to secure the rod thereto and maintain the holder 24 stationary in the tubing. By loosening the nuts 30 and moving the rod endwise, the holder 24 may be adjusted longitudinally of the tubing to insure proper positioning of the guide device 23' relative to the electrodes 4. The adjustment between the rod 27 and holder 24 or between the rod 27 and its support or both adjustments may be utilized to position the guide device 23', but after assembly is made the latter adjustment is utilized to correlate the guide device 23' relative to the electrodes because of the accessibility of the nuts 30.

As shown, the upper wall of the holder 24 is formed with a longitudinally extending recess 31 to freely accommodate the spacing device 16. The lower wall of the holder 24 is formed with recess 32 to receive the rear end portion of the rocker 25, a pin 33 extending transversely through the holder and spanning the recess 32 adjacent the front end thereof serves as the pivot or fulcrum for the rocker.

The holder 24 is preferably formed of bronze, but when formed of steel its walls are chrome plated. The pressure member 26 is provided intermediate its ends with depending lugs 26a which straddle the outer end of the rocker, so that a pin 26b may be employed to pivotally mount the pressure member on the rocker, this arrangement permitting the guide device 23' to be bodily moved upwardly and insure engagement from end to end thereof with the tubing. The guide device 23' may be rigidly secured to the pressure member 26 in any desired manner, but for illustrative purposes its opposite ends are inclined upwardly and inwardly, its outer end removably fitting into a complementary shaped recess 26a' formed in the end wall of the pressure member, so that by means of a clamping device 33' engaging the inner inclined end of the guide device 23', the latter is rigidly but removably secured to the pressure member. The clamping device preferably consists of a plate the front and rear ends of which are arranged to engage the guide device 23' and pressure member 26 and formed intermediate its ends with an opening for a screw 33a which is threaded into the pressure member to secure the plate in position.

The upper surface of the guide device 23' is convex in cross section and consists of an inner guide portion b disposed in advance (that is, in front) of the electrodes 4 with respect to the feed of the tubing and arranged to bridge the seam a and engage the inner marginal walls thereof to maintain them expanded (see Fig. 5) and an outer guide portion c, which has a transverse curvature substantially complementary to the inner marginal walls of the tubing when these walls are squeezed together by the rolls 8, arranged to engage the inner marginal walls of the seam at the point of weld as the squeeze rolls compress the side walls of the tubing to effect contact of the seam edges (see Fig. 5a), these convex guide portions b, c, being connected or merged together by an intermediate guide portion d which is convex in cross section and curved downward and outwardly, the ridge of this intermediate guide portion d having a curvature d' which is approximately concentric to the peripheries of the electrodes 4 (see Figs. 1a and 2). As will be observed from Figs. 1a and 2, the holder 24 is adjusted to position the guide device 23' with its guide portion d' in substantially concentric relation to the peripheries of the electrodes 4, but spaced therefrom a distance slightly greater than the thickness of the tubing wall. In this arrangement the inner end of the convex guide portion c, which end is contiguous to the guide portion d', is in opposed relation to the electrodes at the point where welding of the seam a takes place, and as the guide portion c bridges the seam and is held against the marginal walls thereof under pressure, it prevents flow of the metal, which is melted incident to the supply of current from the electrodes, through the seam or within the tubing walls and accordingly prevents the formation of a burr or bead on the inner wall of the tubing. As shown, the guide portion c is elongated outwardly so that engagement thereof under pressure with the wall of the tubing is maintained after or following the welding of its seam to prevent flow of metal through the seam outwardly of the electrodes until the weld has set.

The pressure of the guide device 23' against the inner walls of the tubing is effected by a coiled spring 34 mounted in an off-set cavity 34a and disposed between the bottom wall of the cavity and the inner end of the rocker 25, the spring 34 being preferably arranged to exert an upward pressure of the guide device 23' on the tubing walls approximating 35 pounds.

It will be observed that (a) the guide portion b of the guide device 23' has a transverse curvature substantially concentric to the tubing walls at opposite sides of the seam a (see Fig. 5) and therefore it co-operates with the spacing device 16 to maintain the tubing walls slightly expanded, so that the seam edges remain out of contact until the contiguous portions of the tubing move into welding position at which time the squeeze rolls 8 force these edges into engagement, the guide portions d and c of the guide device 23' permitting of this engagement and (b) the guide portion c has a transverse curvature substantially concentric to the tubing walls, when they are compressed by the rolls 8, so that the guide portion c may bridge the seam and engage the tubing walls at opposite sides thereof to close the seam interiorly of the tubing as well as to prevent distortion of the tubing due to engagement of the electrodes therewith, the closing of the seam serving to prevent metal flow to the inner side of the tubing.

The guide device 23' is formed of a suitable material, which has a low co-efficient of heat conductivity, is capable of withstanding high temperatures as well as pressure and resists wear under these conditions due to movement of the tubing. In practice I have successfully used a material known as aloxite stone, but Carborundum may be used. Where the guide device 23' is formed of steel or other metal, it is surfaced with a suitable material of the character above set forth of any desired thickness.

It will also be observed that the guide device 23' performs an additional function, namely, in maintaining the seam edges in opposed or alined relation, so that when the squeeze rolls 8 operate on the side walls of the tubing to effect contact of these edges, they do not overlap one on the other, either prior to or during engagement of the electrodes with the tubing walls. This function of the guide device 23' is particularly advantageous where the walls of the tubing are relatively thin.

Where the ultimate application or use of the tubing is such that the formation of a burr or bead on the inner wall of the tubing is immaterial and does not affect such application, I may employ a guide device 23x such as shown in Figs. 6 and 7 wherein it is formed with a longitudinally extending groove 35 to accommodate the inner burr resulting from the welding operation. In this form of construction the guide device 23x serves to maintain the seam edges in opposed or alined relation as contiguous portions of the tubing feeds to and past the electrodes 4.

Figs. 8 and 9 illustrate the application of the invention to tubing B that is polygon in cross section. In this form of construction, the spacing device (not shown) serves to maintain the seam edges out of contact as the tubing feeds to the inner end b' of the guide device 23a, which is mounted on the pressure member 26a on the outer end of a rocker 25a, as hereinbefore set forth, such end b' serving to maintain the seam edges in spaced relation by its engagement with the side walls of the tubing (see Fig. 8). As contiguous portions of the tubing move into welding position the squeeze rolls 8a compress the tubing side walls to effect contact of the seam edges (see Fig. 9) and the outer end portion c' of the guide device 23a, which engages the inner wall of the tubing under pressure in opposed relation to the electrodes 4, closes the seam and prevents the formation of a bead on the inner wall of the tubing.

To those skilled in the art to which my invention relates, many changes in construction and widely differing embodiments and applications thereof will be apparent without departing from the spirit of the invention. My disclosures and the description herein are purely illustrative and not intended to be in any sense limiting.

What I claim is:

1. In apparatus of the class described, the combination with means for continuously feeding preformed tubing having related spaced seam edges adapted to be welded, a pair of fixedly mounted rotatable electrodes adapted to be supplied with electrical energy and rolls in alignment with said electrodes at opposite sides of the tubing, for compressing the walls thereof to move the seam edges into engagement, of a holder fixedly mounted in the tubing in advance of said electrodes, a rocker fulcrumed on the outer end portion of said holder, a device pivotally mounted on the outer end of said rocker and consisting of an outer longitudinally extending guide portion arranged to engage the tubing walls in opposed relation to said electrodes, an inner guide portion spaced from and in advance of said electrodes engaging the tubing walls and serving to maintain the seam edges thereof out of contact and an intermediate guide portion between and contiguous to said inner and outer guide portions and having a curvature longitudinally of the tubing substantially concentric to the peripheries of said electrodes for guiding the marginal edge portions of the tubing from said inner guide portion to said outer guide portion, and a spring between said holder and the inner end of said rocker tending to rock it in one direction, whereby said guide portions of said device are maintained under pressure against the inner walls of the tubing.

2. An apparatus as claimed in claim 1 wherein the tubing engaging portions of said pivotally mounted device are formed of a material having a low coefficient of heat conductivity.

3. In apparatus of the class described, the combination with means for feeding pre-formed hollow work having opposed seam edges to be welded, means for heating the seam edges and rolls for engaging the opposite sides of the work adjacent said heating means, of a device within the work having an inner guide portion disposed in advance of said heating means and spaced therefrom and engaging the marginal edges of the work seam to expand them and maintain the seam edges out of contact, an outer guide portion having a cross section complementary to the inner wall of the work disposed below said heating means and arranged to span the seam between the edges thereof and engage the inner wall of the work at opposite sides of the seam and an intermediate guide portion between said inner and outer guide portions for guiding the marginal edges of the seam from said first mentioned guide portion to said last mentioned guide portion, and means for maintaining said guide portions under pressure engagement with the work walls.

4. In apparatus of the class described, the combination with means for feeding pre-formed hollow metal work having opposed spaced seam edges adapted to be welded, means exteriorly of the work for heating the metal of the seam edges, means engaging the opposite side walls of the work for moving the seam edges together at the point of weld by said heating means, of a device interiorly of the work and mounted to move toward and from the marginal edges of the work seam and consisting of an inner guide portion disposed in advance of the heating means and in engagement with the inner walls of the work, shaped to maintain the seam edges in spaced relation, an outer guide portion below said heating means and between the side wall engaging means shaped to engage the inner walls of the work and bridge the seam between the seam edges thereof to close the inner end thereof to prevent inflow of melted metal beyond the seam and formation of a burr or bead on the inner wall of the work and an intermediate guide portion between said inner and outer guide portions of said device for guiding the marginal edge portions of the seam edges from said inner guide portion to said outer guide portion, and means for maintaining the guide portions of said device in engagement with the work under pressure.

5. In apparatus of the class described, combination with means for feeding pre-formed tubing having seam edges adapted to be welded, a pair of fixedly mounted, rotatable electrodes adapted to be supplied with electric current and arranged to engage the tubing walls at opposite sides of the seam edges and a pair of rollers in transverse alinement with the electrodes engaging the opposite sides of the tubing for moving the seam edges thereof together, of a movably mounted device within the tubing and consisting of a guide portion in opposed relation to said electrodes and having a transverse curvature substantially complementary to the cross sectional shape of the inner walls of the tubing and arranged to maintain the seam edges in opposed or alined relation as the tubing feeds past said electrodes and prevent inflow of melted metal, a transversely curved guide portion spacedly related to said electrodes in advance thereof engaging the marginal edges of the tubing for maintaining the seam edges in separated relation and a transversely curved intermediate guide portion between said guide portions for guiding the marginal edges from said last mentioned guide portion to said first mentioned guide portion, the upper surface of said intermediate guide portion having a longitudinal curvature substantially concentric to the peripheries of said electrodes, and means for maintaining the guide portions of said device in engagement with the tubing walls under pressure.

6. In apparatus of the class described, the combination with means for feeding pre-formed tubing having expanded marginal seam edges adapted to be compressed into contact and welded, a pair of fixedly mounted, rotatable electrodes adapted to be supplied with electric current and arranged to engage the tubing walls at opposite sides of the seam edges and a pair of rolls in transverse alinement with said electrodes engaging the opposite sides of the tubing for moving the seam edges into engagement, of a longitudinally extending transversely convexed shaped device within the tubing and related to the marginal seam edges thereof and spanning the seam therebetween, said device having contiguous convex portions of different radii, its outer end portion fitting the marginal seam edges of the tubing and engaging therewith in opposed relation to said electrodes and arranged to close the lower end of the seam between said edges as the tubing feeds past said electrodes, an inner end portion in front of and spaced from said electrodes and fitting the expanded marginal seam edges to maintain them out of contact and a portion intermediate said end portions and curved longitudinally of said device substantially concentrically to the peripheries of said electrodes for guiding the marginal seam edges inwardly and together in moving from said inner end portion of said device to said outer end portion thereof.

7. An apparatus as claimed in claim 6 wherein said outer end portion of said convexed shaped device is extended longitudinally of the tubing outwardly beyond said electrodes to maintain the seam closed at its lower end during setting of the welded seam.

8. An apparatus as claimed in claim 6 wherein are provided means engaging said convexed shaped device for maintaining the contiguous portions thereof in engagement with the inner walls of the tubing under pressure.

9. In apparatus of the class described, combination with means for feeding pre-formed tubing having seam edges adapted to be welded and a pair of electrodes adapted to be supplied with the electric current and arranged to engage the tubing walls at opposite sides of the seam edges, of a holder fixedly mounted within the tubing, a rocker fulcrummed on said holder, a device fulcrummed on one end of said rocker for movement substantially radially of the tubing and provided with a transversely convexed shaped outer guide portion below and in opposed relation to said electrodes and fitting the inner walls of the tubing for closing the end of the seam between the seam edges as the tubing feeds past said electrodes, a transversely convexed shaped inner guide portion spaced from said electrodes in front thereof and engaging the marginal edges of the tubing, said inner guide portion of said device having a radius greater than said outer guide portion so as to maintain the seam edges out of contact with the marginal edges of the seam as the tubing feeds past said inner guide portion, and means connected to the opposite end of said rocker and tending to maintain said guide portions in engagement with the inner walls of the tubing under pressure.

JOSEPH U. RIDDER.